United States Patent [19]

Athearn

[11] 4,278,744
[45] Jul. 14, 1981

[54] EXPANDABLE CASING FOR ELECTRO-CHEMICAL CELLS

[75] Inventor: Lee F. Athearn, Reading, Mass.

[73] Assignee: Duracell International Inc., Bethel, Conn.

[21] Appl. No.: 873,046

[22] Filed: Jan. 27, 1978

Related U.S. Application Data

[63] Continuation of Ser. No. 643,588, Dec. 19, 1975, abandoned, which is a continuation of Ser. No. 187,762, Oct. 8, 1971, abandoned, which is a continuation-in-part of Ser. No. 822,661, May 7, 1969, abandoned.

[51] Int. Cl.³ .............................................. H01M 2/02
[52] U.S. Cl. ..................................... 429/181; 429/196
[58] Field of Search ............... 429/153, 162, 185, 178, 429/181, 196

[56] References Cited

U.S. PATENT DOCUMENTS

| 395,028 | 12/1888 | Warner et al. | 429/127 |
| 2,389,674 | 11/1945 | MacFarland | 29/623.2 |
| 2,416,079 | 2/1947 | Anthony | 429/159 |
| 2,632,783 | 3/1953 | Coleman et al. | 29/623.1 |
| 2,686,214 | 8/1954 | Arbogast | 429/133 |
| 2,745,894 | 5/1956 | Nowotny | 429/154 |
| 2,995,614 | 8/1961 | Krueger | 429/158 |
| 3,298,871 | 1/1967 | Binder et al. | 429/94 |

Primary Examiner—Donald L. Walton
Attorney, Agent, or Firm—Ronald S. Cornell; Israel Nissenbaum; Martin M. Glazer

[57] ABSTRACT

An expandable air-impermeable casing for an electro-chemical cell comprised of complemental flexible casing sections of a material which provides a diffusion barrier to atmospheric contaminants. The casing provides an expandable compartment for containment of active cell materials, the cell terminal members sealably projecting through the mated casing sections.

A battery shell or container is formed by sealing two side sheets along predetermined linear regions to form several pockets or chambers for accommodating, respectively, the ingredients and elements of an organic cell, and when the respective cell pockets are closed and sealed, the cells thus formed are then folded along intermediate fold lines into a—Z—or accordion pleated form, and then disposed in a protective sealed box as a battery.

3 Claims, 10 Drawing Figures

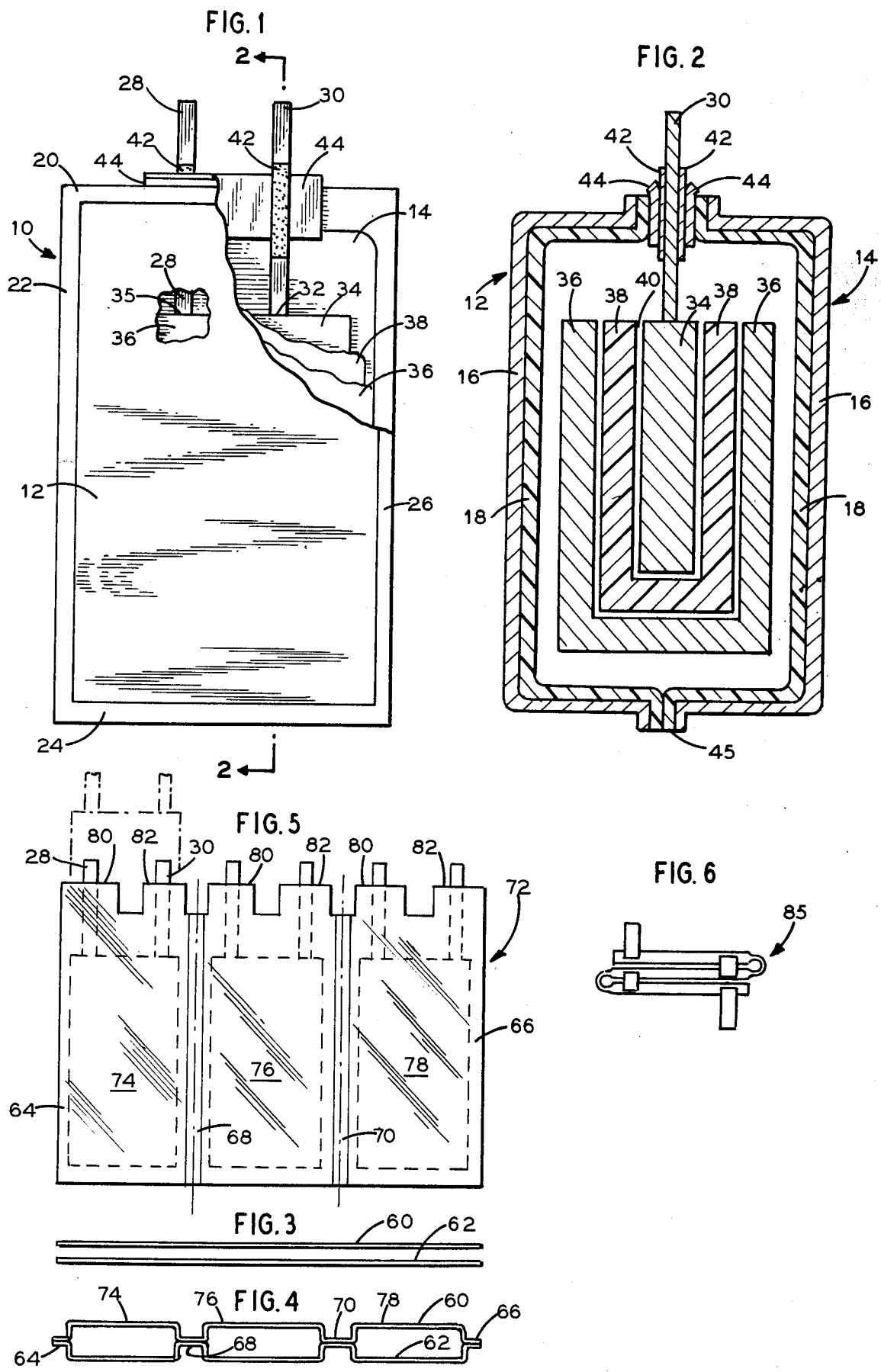

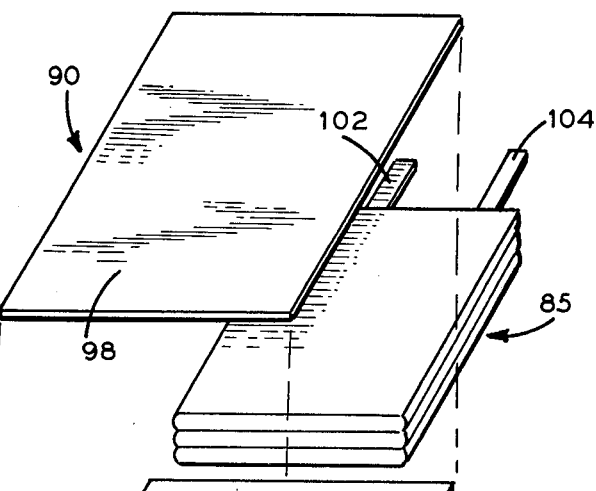
FIG. 8
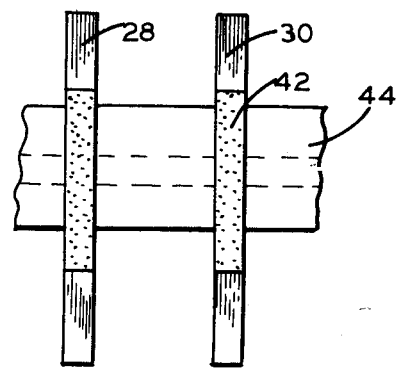
FIG. 7
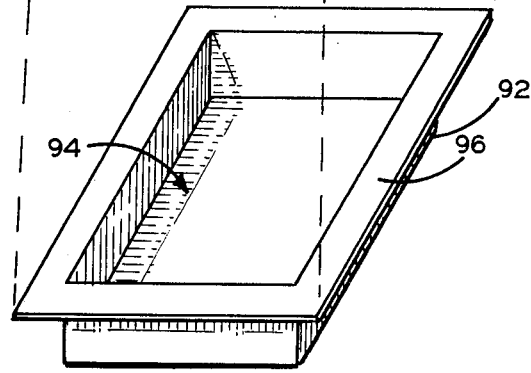
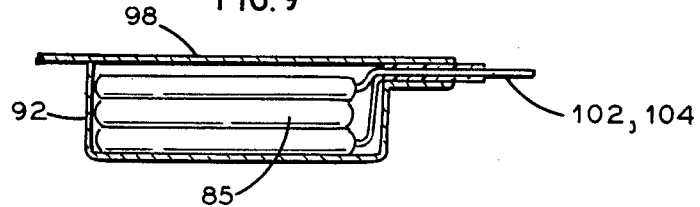
FIG. 9
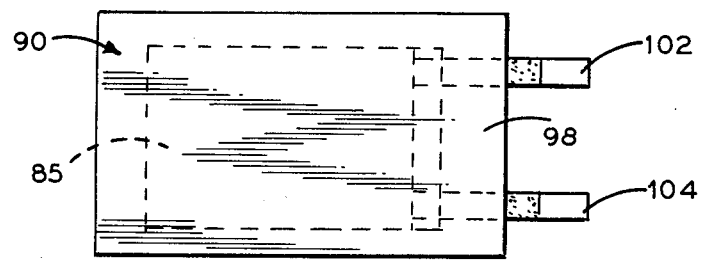
FIG. 10

EXPANDABLE CASING FOR ELECTRO-CHEMICAL CELLS

This is a continuation of application Ser. No. 643,588, filed Dec. 19, 1975, which is a continuation of application Ser. No. 187,762 filed Oct. 8, 1971, which in turn is a continuation-in-part of application Ser. No. 822,661 filed May 7, 1969, all now abandoned.

This invention relates to organic electrolyte batteries and to packaging, and the method of packaging, such batteries in order to make them commercially feasible and available.

Organic electrolyte batteries have a very high energy density compared to batteries of inorganic materials with aqueous electrolyte. Because of the high activity of the elements used with the organic electrolytes to provide high energy density, the packaging for such electro chemical cells must be hermetically sealed.

The objects of this invention are thus dictated by the problems that are encountered in dealing with such highly active components in the environment of the organic electrolytes.

The primary object is to provide contaminant-impermeable cell container for an electro chemical cell.

Packaging techniques employed in the construction of practical cells are generally required to provide several cell sealing functions. Where the cell employs a liquid or otherwise mobile electrolyte, it is necessary that electrolyte creepage to the cell exterior be inhibited to prevent the formation of electrically conductive resistive films on the cell terminals and corrosion of the cell exterior.

A further requirement of cell construction is the protection of cell active materials from atmospheric contamination after assembly. This requirement is particularly important with the advent of cells employing high energy density anode materials such as lithium. The reactivity of such materials with water vapor, nitrogen and other atmospheric contaminants necessitates that the cell casing and seal be air-impermeable.

The primary shortcoming inherent in these known cell construction techniques is manufacturing cost. Each involves the use of a resilient sealing member which must be prefabricated to meet relatively close tolerances and which requires extensive attention in cell assembly. Generally, the sealing member is seated in a first cell casing member. Thereafter the other casing member is seated upon a mating portion of the sealing member and is crimped over the sealing member and the first casing member to complete assembly.

It is an object of the present invention to provide an electro-chemical cell of simplified construction which meets all of these sealing requirements.

It is an additional object of this invention to provide an electrochemical cell having a casting whose active materials are contained against creepage and protected from atmospheric contamination by an improved sealing structure not requiring close tolerance prefabrication or extensive attention during cell assembly.

In accordance with the invention, these objects are efficiently attained by a cell structure having an air-impermeable flexible casing having an opening lined with a sealable material through which the cell terminal connectors extend in a sealed manner.

In the cell of the invention thin metal terminal tabs are connected to the encased cell cathode and anode members. A sealable coating is fused to the terminal tabs over the portions thereof juxtaposed with the lining of the casing opening and non-conductive films having opposed sealable surfaces are disposed intermediate the terminal tab coated portions and the casing lining. All interfaced elements present sealable surfaces to one another which are readily sealed by application of heat and/or pressures to the exterior margins of the casing adjacent the casing opening. There is thus provided an air-impermeable cell.

The terminal tabs of several such cells may be interconnected in series or parallel configuration and the cells encased by a suitably ridged container to provide a battery.

Another object is to provide a hermetically sealed package to contain an organic electrolyte and electrodes made from highly active materials.

Another object of the invention is to provide such an hermetically sealed package that shall be light in weight and that shall have a very low permeability to contaminants, as is required for protecting lithium or other active metals used as anodes.

Another object of the invention is to provide a package with necessary chemical resistance to solvents that are used in organic electrolyte systems, and that shall be able to retain those solvents without any adverse reactions or effects.

Another object of the invention is to provide a hermetically sealed package to contain materials for an electrochemical cell with the package being made from sheet stock materials in a manner that can be easily adapted to machine fabrication.

Another object of the invention is to provide a package for organic electrolyte cells using metal foil-plastic laminate materials.

By way of example, packages have been made from polyethylene film 0.002 thick and appropriately bonded along strips to form two, or a series of more, pockets for containing organic electric cells. Thus packages have been made to contain three or more cells, $LiClO_4$-$THF/V_2O_5$, and are then heat sealed in a dry argon atmosphere. It is recognized that the THF may permeate through the polyethylene film at a fairly high rate, but as long as the film is pin-hole free, lithium perchlorate will not pass through.

The foil laminate outer package provides the required impermeable layer that prevents loss of solvent evaporation. It is recognized that the volume space between the polyethylene film cell packages and the foil laminate package will become saturated with THF solvent vapor. It is also recognized that small amounts of liquid solvent may condense in this volume space due to temperature changes. If the polyethylene film is pin-hole free there will be no electrolytic conduction between the cells and therefore no common electrolyte shorting of the cells will occur. This packaging concept can also be extended to the use of a drawn thin metal cup as shown in the drawings for the battery container. The surface of this cup are coated with polyethylene or other suitable heat sealable plastic to permit of hermetic sealing of the battery, single or multi-cells.

The scope of this invention is to provide a new sealed package with the following properties and advantages:
1. Leak proof structure;
2. Light weight package;
3. Low cost package;
4. Materials used in a manner that makes fabrication easy;
5. Flexible package to prevent pressure build up;

6. Inertness of packaging materials to active cell components;
7. Impermeable barriers for solvents, vapors and gases;
8. Permits use of all materials, compatible with the electrolyte, other than those stated within the scope of this disclosure; and
9. In particular, the use of plastic-metal foil laminates.

These and other features of the invention will be evident from the following detailed description of a preferred embodiment of the cell structure and of the method of assembly of the invention, and from the accompanying drawings, in which FIG. 1 is a front elevational view of a cell constructed in accordance with the invention, the drawing being partly cut away to illustrate internal cell detail;

FIG. 2 is a sectional view of the cell of FIG. 1 taken along the line II—II;

FIG. 3 is a schematic plan view of two sheets for forming the side walls of a multi-cell battery container or shell;

FIG. 4 is a schematic plan view of the sheets of FIG. 3 heat sealed to be bonded along selected linear regions to form and constitute a container shell with several cavities or pockets for respectively accommodating the elements and ingredients or an organic cell;

FIG. 5 is a side elevational view of a multi-pocket multi-cell structure to constitute a multi-cell battery;

FIG. 6 is a schematic end view of the multi-cell battery of FIG. 5 shown in folded—Z—arrangement for disposition in a container of small volume;

FIG. 7 is a schematic front view of a closure to be sealed between two facing sealing surfaces, at the opening of a pocket, or between two closure borders of a container;

FIG. 8 is an exploded view of a box container and—Z—folded multi-cell battery in open condition before assembly and closure;

FIG. 9 is a vertical sectional view of the box assembly of FIG. 8 when closed and sealed; and FIG. 10 is a plan view of the box assembly of FIG. 9 and shows the spacing of the electrode terminals.

Referring to FIG. 1, the illustrated electrochemical cell has a casing 10 comprised of opposed complementary casing sections 12 and 14. As shown in the sectional view of the cell (FIG. 2) each casing section includes an outer layer 16 of a flexible air-impermeable material and an inner flexible supporting layer 18 adhered to layer 16 and comprised of a material exhibiting chemical inertness to cell active materials. Layer 16 functions as a diffusion barrier, having a characteristic impermeability to water vapor, nitrogen and other atmospheric contaminants deleterious to electrochemical cell performance. Particularly suitable for use as layer 16 is a thin metallic film or a thin foil of a metal. For example, aluminum may be deposited directly upon the supporting substrate provided by layer 18. This substrate is preferably a synthetic plastic and as such not only provides a chemically inert barrier between the cell components and the metallic film, but provides the sufficient strength to protect the structurally delicate film from breakage. A plastic film or lacquer may be applied to the exterior surface of the metallic film to provide further protection against abrasion during handling.

While deposition of layer 16 onto layer 18 is sufficient for formation and joinder of the layers, the layers may be formed individually and then joined by an adhesive to form a laminated plastic-metallic foil casing section. An aluminum-polyethylene laminate has been employed with success.

Casing sections 12 and 14 are preferably of the configuration illustrated in the drawings, i.e. having side walls with upper and lower folds terminating in flanged co-planar marginal portions 20, 22, 24 and 26. The opposed casing sections are mated with these marginal portions in alignment to define an interior compartment therein. They are joined by application of heat and/or pressure of other suitable sealing energy to opposed marginal portions 22, 24 and 26 such that a seal evolves along the seams defined by these marginal portions. Marginal portion 20 remains open for insertion of the cell components. It is not required that interior layer 18 be sealable in character but only that it provide support required for layer 16 and provide a chemical inert surface interiorly of the cell. Where layer 18 is not sealable a suitable adhesive or sealable material may be employed in joining the opposed casing sections at marginal portions 22, 24 and 26.

The cell is equipped with a pair of terminal tabs 28 and 30 for electrical connection of the cell to a utilization device. Interiorly of casing 10 the terminal tabs are connected to the cell active members, the connection of terminal 30 at junction 32 to the cell cathode 34 being illustrated in the cut away section of FIG. 1. Terminal tab 28 is similarly connected at junction 35 to the cell anode 36 by spot welding or other suitable method of joinder.

As is illustrated in FIG. 2, cell cathode 34 may comprise a mass of material in the form of a slug or the like. Cell anode 36 is preferably U-shaped in cross-section such that it provides a surface area electrochemically active with essentially all of the cathode surface. A U-shaped barrier member 38 is disposed between cathode 34 and anode 36 for purposes of separating same. The invention is not restricted to any particular set of cell constituents nor is there any other requirement for barrier member 38 than that it be a conventional microporous and ionically permeable element which permits free flow of the cell electrolyte 40 between the cathode and anode to a negligible rate and prevents direct contact of the active cell elements. Glass filter paper, nylon separator material or the like may be employed.

In assembling the cell elements for introduction into the casing, terminal tabs 28 and 30 are first coated over a portion of their length with a sealable material. Referring to the drawings, it will be seen that this coating 42 will extend from a lower extremity slightly below marginal top regions 20 of the casing sections 12 and 14 to an upper extremity considerably above marginal top regions 20. A preferred but not exclusive coating material is polyethylene and it may be adhered to the terminal tabs by fusion.

The coated terminal tabs are next conductively secured to cathode 34 and anode 36. The separator 38 and the anode are positioned about the cathode. Electrolyte 40 is contained in separator 38 which has suitable electrolyte-absorbent characteristics. The assembly is positioned in the casing compartment such that coating 42 is disposed with its extremities in the above-discussed relation to marginal regions 20.

Non-conductive members 44 are inserted into the assembly, such that they reside in the casing opening between tab coatings 42 and the marginal regions 20 of casings 12 and 14. These members are preferably polyethylene films and are positioned as shown in the drawings, i.e. with their upper edges interposed between the upper edges of marginal regions 20 and the upper extremity of coating 42. As is shown further (FIG. 1) the lateral expanse of films 44 is sufficient to permit the sides of the films to extend beyond the sides of terminal tabs 28 and 30. In selecting alternatives to the preferred synthetic plastic film, it is required only that members 44 be sealable.

As will be evident in the drawings, the casing opening formed by opposed separated marginal regions 20 of the casing sections 12 and 14 is provided with a sealable lining. In the preferred embodiment, this lining is provided by the interior layer 18 and adjoins the non-conductive spacing members 44. It will be evident that, in the event that supporting layer 18 is not a sealable material, the lining may be provided at the casing opening by coating the interior of casing marginal regions 20 with a suitable sealable material.

cell assembly is completed by application of sealing energy to marginal regions 20 of layers 16 of laminates 12 and 14. Where the interposed elements, i.e. the lining (layer 18), tab coating 42 and films 44 present heat-sealable surfaces to one another the casing opening is readily sealed by application of heat and pressure. By virtue of the lateral expanse of films 44 discussed immediately above, opposed side edges of the films snugly seal about the sides of the terminal tabs, thereby rendering the top marginal region 20 sealed along its entire length.

As was mentioned previously, it is requisite that a diffusion barrier be provided about the entire cell exterior to prevent ingress and egress of solvent vapors of atmospheric contaminants into the cell, particularly where anode materials of high electro-positivity are employed. It has been determined that the thin layer of synthetic plastic material constituting the interior layer 18 does not provide the required degree of impermeability to perform alone as a diffusion barrier. Thus, there is need for exterior air-impermeable layer 16.

It will be observed that in the cell construction of the invention there are, even after cell sealing, unmetallized areas exposed to the atmosphere surrounding the cell casing, e.g. the upper edge of the sealed margins 20, 24. However, it will be further observed that in these areas atmospheric contaminants must travel through an extended barrier, quite large compared with the thickness of membrane 18 in order to enter the cell. For example, at the seal interface of marginal region 20 the shortest distance for contaminant travel is approximately equal to the depth of films 44. Similarly, at the seal interface 45 of lower marginal region 24 the travel distance for contaminants is approximately equal to the depth of the entire marginal region. We have found that in view of the limited areas exposed to contaminants unmetallized barriers and, in conjunction with the diffusion barrier provided by layer 16, insure freedom of cell components from atmospheric contamination and loss of electrolyte solvents.

Film 44 in the preferred embodiments are formed as illustrated in the drawings wherein two films each on opposite surfaces of terminal tabs 28 and 30 are employed. Alternatively, four films may be employed each of sufficient lateral expanse to enclose the side edges of one terminal tab. In this type of configuration the central area of marginal region 20 would be sealed by the direct seal interface provided by opposed interior layers 18.

Terminal tabs 28 and 30 may be comprised of stainless steel shim stock, 0.001 inch thick which is abrasive blasted and degreased in acetone. The tabs are coated by dissolving approximately 50 grams of low melting polyethylene powder in 200 ml. xylene by slowly heating and stirring the mixture. As the solution becomes water clear, the terminal tabs are dipped therein and then dried. The resulting coating of polyethylene is fused to the tabs by heating same at 150° C. for 10 to 15 minutes. A preferred thickness for the films 44 is approximately 0.0005 inch.

Various tests were conducted to determine the effectiveness of the cells having casing and sealing structure in accordance with the invention. In one practical cell test, cells employing a lithium anode, a cathode comprised of a mixture of vanadium pentoxide active cathode material and conductive particulate matter and an electrolyte of lithium perchlorate salt in tetrahydrofuran were assembled in a dry argon atmosphere in the casing of FIGS. 1 and 2. These organic electrolyte cells were discharged over a period of one week in a normal room atmosphere. No loss of the highly volatile solvent was noted and further as was evidenced by the absence of swelling of the flexible cell casing, no atmosphere water vapor transferred into the cell.

In a second test shelf life of cells employing the structure of the invention was investigated in two separate evaluations. In the first evaluation, lithium metal and an organic electrolyte were placed in the cell casing of the invention in a dry argon atmosphere. The cells were sealed and thereafter stored for one week in a room atmosphere. The cells were then opened and the lithium metal was analyzed to determine whether local energy actions therein involving water or nitrogen occurred. Upon inspection there was no indication that the lithium was in any way attacked by these atmospheric contaminants. In the second evaluation an organic electrolyte comprised of lithium perchlorate salt in tetrahydrofuran was sealed in cell casings described in FIGS. 1 and 2. In order to determine electrolyte creepage from the cells, the cell casings were weighed upon assembly and thereafter exposed to room atmosphere. The cells were reweighed periodically throughout the two week period. No weight change was observed during the period of examination.

The terminal sub-assembly and sealing closure including the terminal elements 28 and 30 is shown in further detail in FIG. 7, to illustrate the manner in which the sub-assembly is utilized to provide simple closures of a further extension of the invention, in which multi-cell unitary structures may now be made available in simple easily constructed assemblies for a multi-cell battery.

The extension of the invention to permit multi-cell structures to be made and assembled is shown in FIGS. 3, 4, 5 and 6, to illustrate the functional operation by means of which a multi-cell structure may be easily formed. As shown in FIG. 3, two sheets 60 and 62 of the double layer material as shown in FIGS. 1 and 2, with each sheet 60 and 62 embodying the metallic layer and the plastic layer to obtain the benefit of their respective functional characteristics, as previously described where shown in the structures of FIGS. 1 and 2.

The two sheets 60 and 62 are then heat sealed at and along the side border regions 64 and 66 and two intermediate vertical regions 68 and 70, as shown in FIG. 4, and as more fully then shown in FIG. 5, where the lower border region 72 is also heat sealed across the bottom of the two sheets, so that the several sealing operations will seal and bond the two sheets 60 and 62 in such manner as to form a package structure 72 having three pockets 74, 76 and 78 formed therein, which then serve as cell compartments to receive the ingredients and elements of the individual cells corresponding to the structural arrangements shown in FIG. 1 and FIG. 2.

In the construction of this multiple cell structure 72, the pockets 74, 76 and 78 are generally open at the top between the heat-sealed border regions 64 and 66, and the intermediate heat-sealed vertical regions 68 and 70.

The purpose of heat sealing the sheet 60 and 62 in the manner shown is to enable the intermediate heat seals 68 and 70 to serve not only as sealed border edges for the pockets on both sides of those sealed regions 68 and 70, but also to enable the material thus heat sealed along those regions 68 and 70 to serve as fold lines about which the respective cells, when completed, may be folded into a —Z-arrangement as shown in FIG. 6.

It will be obvious that the disposition of the cell material and their terminals may be pre-arranged so that the final connections between the terminals may be made conveniently for series or for parallel connections.

In the arrangement shown in FIG. 6, the cell material is disposed in the pockets of structure 72 in such a manner that the cells may be conveniently connected for series circuit operation, without requiring crossovers between the terminals of the cells. For a parallel connection between the cells, it is obvious that the disposition of the cell materials with their terminals will be such as to dispose the corresponding terminals in direct super position when the cell structure is folded into the —Z-arrangement.

For simplicity of illustration, only three cells have been illustrated in the complete structure 72, but it will be obvious that any number of such pockets can be formed in a structure embodying the two sealed sheets, as in FIG. 3 and in FIG. 4. Similarly, the cell materials could be disposed to permit simple interconnections to be made between the cells when the cells are folded into —Z-relationship, depending upon whether parallel or series connections would be desired in the ultimate battery assembly.

In the formation of each cell unit, the terminal assembly of FIGS. 1, 2 and 7 will be disposed along and between the upper border edges of the original sheets 60 and 62, so that a heat sealing operation along the top region of the two sheets 60 and 62 will establish a fused heat seal between the inner polyethylene sheet of each combination in the double sheets 60 and 62, onto the polyethylene film enclosing the steel terminals strips shown as 28 and 30 in FIG. 1 and FIG. 7.

In this manner, after the cells are assembled as individually complete units, the entire structural assembly may be easily sealed in one continuous operation along the top border surfaces of the structural side sheets 60 and 62, thereby to completely seal each and all of the units, individually, and at the same time to seal the entire battery, so that it may then be readily and safely handled and manipulated along the respective vertical sealed regions, as fold lines, in the form of an accordion pleat, to dispose the cells in a stack with the terminals of the cells disposed in proper adjacent relationship to permit simple and easy direct interconnections between the cells, while leaving the two outer terminals free for connection to an external circuit.

In the arrangement shown in FIG. 5, the upper portions 80 and 82 of the sealing assemblies for the terminals are shown as being applied individually to each terminal for a short distance vertically, with a gap between the upper portions 80 and 82 of the respective cells, to provide a small cover portion to permit folding of the terminals in opposite directions, when necessary, without a foldover cover of one terminal being able to disturb the foldover cover section of the other terminal.

The —Z-folded stack 85, shown in FIG. 6, may then be disposed in a protective container 90, which may be assembled as in FIG. 8, as a cup or box 92 with a compartment 94 to receive the cell stack 85, and having a sealing border 96 surrounding the compartment 94 to receive a cover 98, to fit over and be heat sealed to the sealing border 96, with the end terminals 102 and 104 of the battery of cells extending from the box as shown in FIGS. 9 and 10, in spaced relation.

The container 90 may be formed of protective aluminum foil coated with heat-sealable film to provide a sealed enclosure when the cover lid is sealed to the border 96.

In the arrangement of FIGS. 9 and 10, the closure support for the terminal tabs 28 and 30 will be of the type in FIG. 7 to provide additional insulation between the tabs and the container.

In the folding of the cells into a stack, it is desirable to insert a sheet of insulation between the respective adjacent cells to prevent, for example, a corner of any sealed region from puncturing an adjacent cell.

In practical utilization of cells constructed in accordance with the invention, as distinguished from the experimental testing reported above, the cells may also be provided with a rigid outer container and may be combined by appropriate electrical interconnection of the terminal conductors of individual cells to provide a battery of increased output voltage. The rigid container may be in the form of a metal can or the like of sufficient internal dimensions to advantageously permit unrestricted expansion of the cell casings of the invention where the cell active materials give rise to pressure buildup during utilization of the battery.

While the invention has been described in connection with a particularly preferred embodiment, it will be evident that various modifications can be made therein without departing from the scope of the present invention. Thus, it is intended that the foregoing description be interpreted in a descriptive and not in a limiting sense.

What is claimed is:

1. An electrochemical cell containing a lithium anode, an electrolyte salt, an organic electrolyte solvent, and a cathode, and said cell having an hermetically sealed, flexible casing with terminals extending through sealed openings in the casing; wherein said casing is formed from a laminated material comprising a first inner layer which is permeable to vapors of said electrolyte solvent but free of pinholes, thereby rendering it impermeable to said electrolyte salt, and said inner layer being substantially completely surrounded by an outer, air impermeable metal barrier layer which prevents the vapors of said electrolyte solvent from escaping.

2. An electrochemical cell as in claim 1 wherein said electrolyte salt is lithium perchlorate, said organic electrolyte solvent is tetrahydrofuran, and said cathode comprises vanadium pentoxide.

3. An electrochemical cell as in claim 1 wherein said laminated material comprises an inner layer of polyethylene and an outer layer of aluminum.

* * * * *